United States Patent [19]

Bahl et al.

[11] Patent Number: 5,222,146

[45] Date of Patent: Jun. 22, 1993

[54] SPEECH RECOGNITION APPARATUS HAVING A SPEECH CODER OUTPUTTING ACOUSTIC PROTOTYPE RANKS

[75] Inventors: Latit R. Bahl, Amawalk; Peter V. De Souza, Mahopac Falls; Ponani S. Gopalakrishnan, Croton-on-Hudson; Michael A. Picheny, White Plains, all of N.Y.

[73] Assignee: International Business Machines Corporation, Armonk, N.Y.

[21] Appl. No.: 781,440

[22] Filed: Oct. 23, 1991

[51] Int. Cl.$^5$ .......................... G10L 5/00; G10L 3/02; G10L 5/06

[52] U.S. Cl. ...................................... 381/41; 381/30; 381/36; 381/43

[58] Field of Search ...................... 381/30, 31, 36, 41, 381/43, 44, 52

[56] References Cited

U.S. PATENT DOCUMENTS

| | | | |
|---|---|---|---|
| 4,435,617 | 3/1984 | Griggs | 381/44 |
| 4,587,670 | 5/1986 | Levinson et al. | 381/43 |
| 4,624,011 | 11/1986 | Watanabe et al. | 381/43 |
| 4,718,094 | 1/1988 | Bahl et al. | 381/43 |
| 4,805,207 | 2/1989 | McNutt et al. | 381/52 |
| 4,817,156 | 3/1989 | Bahl et al. | 381/43 |
| 4,819,271 | 4/1989 | Bahl et al. | 381/43 |
| 4,831,653 | 5/1989 | Katayama | 381/43 |
| 4,837,831 | 6/1989 | Gillick et al. | 381/43 |
| 4,918,731 | 4/1990 | Muroi | 381/43 |
| 4,926,488 | 5/1990 | Nadas et al. | 381/41 |
| 4,980,918 | 12/1990 | Bahl et al. | 381/43 |
| 5,020,107 | 5/1991 | Rohani et al. | 381/43 |
| 5,031,217 | 7/1991 | Nishimura | 381/43 |
| 5,040,213 | 8/1991 | Yasuda et al. | 381/43 |
| 5,046,099 | 9/1991 | Nishimura | 381/43 |
| 5,058,167 | 10/1991 | Kimura | 381/43 |
| 5,072,452 | 12/1991 | Brown et al. | 381/43 |

OTHER PUBLICATIONS

Bahl, L. R., et al. "Speaker-Independent Label Coding Apparatus." U.S. patent application Ser. No. 673,810, filed Mar. 22, 1991.

Bahl, L. R., et al. "Vector Quantization Procedure For Speech Recognition Systems Using Discrete Parameter Phoneme-Based Markov Word Models." IBM Technical Disclosure Bulletin, vol. 32, No. 7, Dec. 1989, pp. 320-321.

Jelinek, F. "Continuous Speech Recognition by Statistical Methods." Proceedings of the IEEE, vol. 64, No. 4, pp. 532-556, Apr. 1976.

Jelinek, F., et al. "Interpolated Estimation of Markov Source Parameters From Sparse Data." Pattern Recognition in Practice, pp. 381-402, 1980.

*Primary Examiner*—Dale M. Shaw
*Assistant Examiner*—Kee M. Tung
*Attorney, Agent, or Firm*—Marc D. Schechter

[57] ABSTRACT

A speech coding and speech recognition apparatus. The value of at least one feature of an utterance is measured over each of a series of successive time intervals to produce a series of feature vector signals. The closeness of the feature value of each feature vector signal to the parameter value of each of a set of prototype vector signals is determined to obtain prototype match scores for each vector signal and each prototype vector signal. For each feature vector signal, first-rank and second-rank scores are associated with the prototype vector signals having the best and second best prototype match scores, respectively. For each feature vector signal, at least the identification value and the rank score of the first-ranked and second-ranked prototype vector signals are output as a coded utterance representation signal of the feature vector signal, to produce a series of coded utterance representation signals. For each of a plurality of speech units, a probabilistic model has a plurality of model outputs, and output probabilities for each model output. Each model output comprises the identification value of a prototype vector and a rank score. For each speech unit, a match score comprises an estimate of the probability that the probabilistic model of the speech unit would output a series of model outputs matching a reference series comprising the identification value and rank score of at least one prototype vector from each coded utterance representation signal in the series of coded utterance representation signals.

27 Claims, 2 Drawing Sheets

SPEECH RECOGNITION APPARATUS HAVING A SPEECH CODER OUTPUTTING ACOUSTIC PROTOTYPE RANKS

BACKGROUND OF THE INVENTION

The invention relates to speech coding devices and methods, such as for speech recognition systems.

In speech recognition systems, it has been known to model speech units (for example words, subwords, or word sequences) as producing either (1) acoustic feature vectors representing the values of the features of an utterance, or (2) acoustic labels representing discrete sets of acoustic feature vectors. Models producing acoustic feature vectors are sometimes referred to as continuous parameter models. On the other hand, models producing acoustic labels are sometimes referred to as discrete parameter models. While continuous parameter models are capable of representing more acoustic information than discrete parameter models (and are therefore capable of more accurately representing speech units), continuous parameter models are also more difficult to accurately build than discrete parameter models.

SUMMARY OF THE INVENTION

It is an object of the invention to provide a speech coding method and apparatus which is capable of representing more acoustic information than coding for discrete parameter models, and which is easier to model than continuous parameter models.

It is another object of the invention to provide a speech recognition system and method which is capable of modeling speech units with more acoustic information than a discrete parameter model, yet which is easier to produce than a continuous parameter model.

According to the invention, a speech coding method and apparatus comprises means for measuring the value of at least one feature of an utterance over each of a series of successive time intervals to produce a series of feature vector signals representing the feature values. Storage means are provided for storing a plurality of prototype vector signals. Each prototype vector signal has at least one parameter value and has a unique identification value. Means are provided for comparing the closeness of the feature value of a first feature vector signal to the parameter values of the prototype vector signals to obtain prototype match scores for the first feature vector signal and each prototype vector signal. Ranking means associates a first-rank score with the prototype vector signal having the best prototype match score. A second-rank score is associated with the prototype vector signal having the second-best prototype match score. At least the identification value and the rank score of the first-ranked prototype vector signal and the identification value and the rank score of the second-ranked prototype vector signal are output as a coded utterance representation signal of the first feature vector signal.

Preferably, all of the prototype match scores for the first feature vector signal are ranked from highest to lowest. A rank score representing the estimated closeness of the associated prototype vector signal to the first feature vector signal relative to the estimated closeness of all other prototype vector signals to the first feature vector signal is associated with each prototype match score. The identification value and the rank score of each prototype vector signal are output as a coded utterance representation signal of the first feature vector signal.

It is also preferred that the invention further comprise means for storing the coded utterance representation signals of all of the feature vector signals.

In one aspect of the invention, the rank score for a selected prototype vector signal and for a given feature vector signal is monotonically related to the number of other prototype vector signals having prototype match scores better than the prototype match score of the selected prototype vector signal for the given feature vector signal.

Preferably, the means for storing prototype vector signals comprises electronic read/write memory. The measuring means may comprise, for example, a microphone.

A speech recognition apparatus and method according to the invention includes means for measuring the value of at least one feature of an utterance over each of a series of successive time intervals to produce a series of feature vector signals representing the feature values. A storage means stores a plurality of prototype vector signals. Each prototype vector signal has at least one parameter value and has a unique identification value. Comparison means compares the closeness of the feature value of each feature vector signal to the parameter values of the prototype vector signals to obtain prototype match scores for each feature vector signal and each prototype vector signal.

Ranking means associates, for each feature vector signal, a first-rank score with the prototype vector signal having the best prototype match score, and a second-rank score with the prototype vector signal having the second best prototype match score. Means are providing for outputting, for each feature vector signal, at least the identification value and the rank score of the first-ranked prototype vector signal, and the identification value and the rank score of the second-ranked prototype vector signal, as a coded utterance representation signal of the feature vector signal, to produce a series of coded utterance representation signals.

The speech recognition apparatus and method further includes means for storing probabilistic models for a plurality of speech units. At least a first model for a first speech unit has (a) at least two states, (b) at least one transition extending from a state to the same or another state, (c) a transition probability for each transition, (d) a plurality of model outputs for at least one prototype vector at a transition, and (e) output probabilities at a transition for each model output. Each model output comprises the identification value of the prototype vector and a rank score.

A match score processor generates a match score for each of a plurality of speech units. Each match score comprises an estimate of the probability that the probabilistic model of the speech unit would output a series of model outputs matching a reference series comprising the identification value and rank score of at least one prototype vector from each coded utterance representation signal in the series of coded utterance representation signals. The one or more best candidate speech units having the best match scores are identified, and at least one speech subunit of one or more of the best candidate speech units is output.

Preferably, a rank score is associated with all prototype vector signals for each feature vector signal. Each rank score represents the estimated closeness of the associated prototype vector signal to the feature vector signal relative to the estimated closeness of all prototype vector signals to the feature vector signal. For each feature vector signal, the identification values and the rank score of all prototype vector signals are output as a coded utterance representation signal of the feature vector signal.

Preferably, each match score further comprises an estimate of the probability of occurrence of the speech unit.

The means for storing prototype vector signals may comprise electronic read/write memory. The measuring means may comprise a microphone. The speech subunit output means may comprise a video display, such as a cathode ray tube, a liquid crystal display, or a printer. Alternatively, the speech subunit output means may comprise an audio generator, for example having a loudspeaker or a headphone.

According to the present invention, by encoding each acoustic feature vector with the ranks of all prototype vectors, the coded speech signal contains more information than a discrete parameter coded signal. At the same time, it is easier to model the production of prototype vector ranks, than it is to model the production of continuous parameter acoustic feature vectors.

DESCRIPTION OF THE PREFERRED EMBODIMENTS

Figure 1:
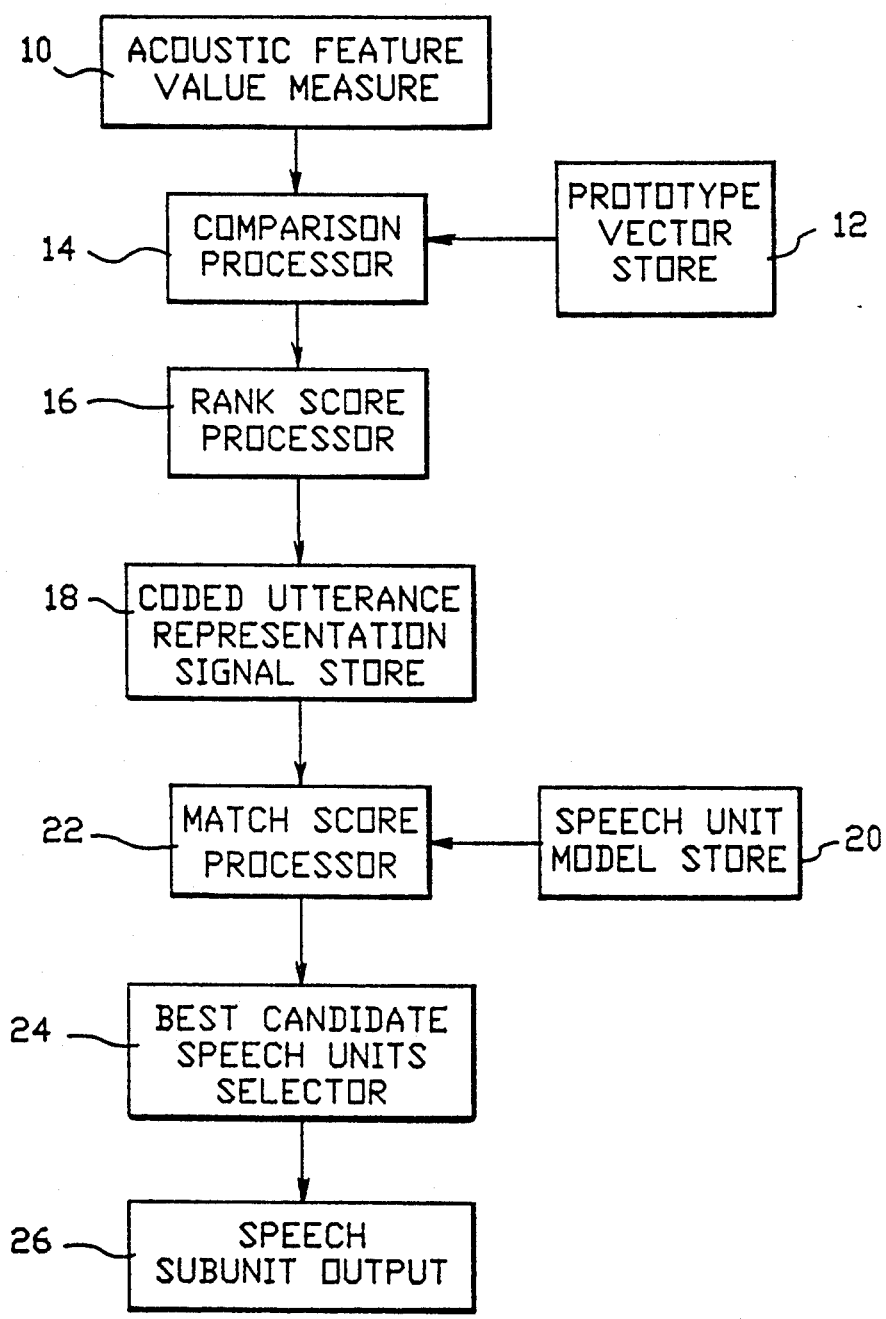
FIG. 1 is a block diagram of an example of a speech recognition apparatus according to the present invention.

FIG. 1 is a block diagram of an example of a speech recognition apparatus according to the present invention containing a speech coding apparatus according to the present invention. An acoustic feature value measure 10 is provided for measuring the value of at least one feature of an utterance over each of a series of successive time intervals to produce a series of feature vector signals representing the feature values. Table 1 illustrates a hypothetical series of one-dimension feature vector signals corresponding to time intervals t1, t2, t3, t4, and t5, respectively.

TABLE 1

| time | t1 | t2 | t3 | t4 | t5 |
|---|---|---|---|---|---|
| Feature Value | 0.18 | 0.52 | 0.96 | 0.61 | 0.84 |

A prototype vector store 12 stores a plurality of prototype vector signals. Each prototype vector signal has at least one parameter value and has a unique identification value.

Table 2 shows a hypothetical example of five prototype vectors signals having one parameter value each, and having identification values P1, P2, P3, P4, and P5, respectively.

TABLE 2

| Prototype Vector Identification Value | P1 | P2 | P3 | P4 | P5 |
|---|---|---|---|---|---|
| Parameter Value | 0.45 | 0.59 | 0.93 | 0.76 | 0.21 |

A comparison processor 14 compares the closeness of the feature value of each feature vector signal to the parameter values of the prototype vector signals to obtain prototype match scores for each feature vector signal and each prototype vector signal.

Table 3 illustrates a hypothetical example of prototype match scores for the feature vector signals of Table 1, and the prototype vector signals of Table 2.

TABLE 3

| | Prototype Vector Match Scores | | | | |
|---|---|---|---|---|---|
| time | t1 | t2 | t3 | t4 | t5 |
| Prototype Vector Identification Value | | | | | |
| P1 | 0.27 | 0.07 | 0.51 | 0.16 | 0.39 |
| P2 | 0.41 | 0.07 | 0.37 | 0.02 | 0.25 |
| P3 | 0.75 | 0.41 | 0.03 | 0.32 | 0.09 |
| P4 | 0.58 | 0.24 | 0.2 | 0.15 | 0.08 |
| P5 | 0.03 | 0.31 | 0.75 | 0.4 | 0.63 |

In the hypothetical example, the feature vector signals and the prototype vector signal are shown as having one dimension only, with only one parameter value for that dimension. In practice, however, the feature vector signals and prototype vector signals may have, for example, fifty dimensions, where each dimension has two parameter values. The two parameter values of each dimension may be, for example, a mean value and a standard deviation (or variance) value.

Still referring to FIG. 1, the speech recognition and speech coding apparatus further comprise a rank score processor 16 for associating, for each feature vector signal, a first-rank score with the prototype vector signal having the best prototype match score, and a second-rank score with the prototype vector signal having the second best prototype match score.

Preferably, the rank score processor 16 associates a rank score with all prototype vector signals for each feature vector signal. Each rank score represents the estimated closeness of the associated prototype vector signal to the feature vector signal relative to the estimated closeness of all other prototype vector signals to the feature vector signal. More specifically, the rank score for a selected prototype vector signal for a given feature vector signal is monotonically related to the number of other prototype vector signals having prototype match scores better than the prototype match score of the selected prototype vector signal for the given feature vector signal.

Table 4 shows a hypothetical example of prototype vector rank scores obtained from the prototype match scores of Table 3.

TABLE 4

| | Prototype Vector Rank Scores | | | | |
|---|---|---|---|---|---|
| time | t1 | t2 | t3 | t4 | t5 |
| Prototype Vector Identification Value | | | | | |
| P1 | 2 | 1 | 4 | 3 | 4 |
| P2 | 3 | 1 | 3 | 1 | 3 |
| P3 | 5 | 5 | 1 | 4 | 2 |
| P4 | 4 | 3 | 2 | 2 | 1 |
| P5 | 1 | 4 | 5 | 5 | 5 |

As shown in Tables 3 and 4, the prototype vector signal P5 has the best (in this case the closest) prototype match score with the feature vector signal at time t1 and is therefore associated with the first-rank score of "1". The prototype vector signal P1 has the second best prototype match score with the feature vector signal at time t1, and therefore is associated with the second-rank score of "2". Similarly, for the feature vector signal at time t1, prototype vector signals P2, P4, and P3 are ranked "3", "4" and "5" respectively. Thus, each rank score represents the estimated closeness of the associated prototype vector signal to the feature vector signal relative to the estimated closeness of all other prototype vector signals to the feature vector signal.

Alternatively, as shown in Table 5, it is sufficient that the rank score for a selected prototype vector signal for a given feature vector signal is monotonically related to the number of other prototype vector signals having prototype match scores better than the prototype match score of the selected prototype vector signal for the given feature vector signal. Thus, for example, prototype vector signals P5, P1, P2, P4, and P3 could have been assigned rank scores of "1", "2", "3", "3" and "3", respectively. In other words, the prototype vector signals can be ranked either individually, or in groups.

TABLE 5

| time | Prototype Vector Rank Scores (alternative) | | | | |
|---|---|---|---|---|---|
| | t1 | t2 | t3 | t4 | t5 |
| Prototype Vector Identification Value | | | | | |
| P1 | 2 | 1 | 3 | 3 | 3 |
| P2 | 3 | 1 | 3 | 1 | 3 |
| P3 | 3 | 3 | 1 | 3 | 2 |
| P4 | 3 | 3 | 2 | 2 | 1 |
| P5 | 1 | 3 | 3 | 3 | 3 |

In addition to producing the rank scores, rank score processor 16 outputs, for each feature vector signal, at least the identification value and the rank score of the first-ranked prototype vector signal, and the identification value and the rank score of the second-ranked prototype vector signal, as a coded utterance representation signal of the feature vector signal, to produce a series of coded utterance representation signals.

Returning to FIG. 1, the speech coding and speech recognition apparatus according to the invention preferably includes a coded utterance representation signal store 18 for storing the coded utterance representation signals of all of the feature vector signals.

A speech unit model store 20 is provided for storing probabilistic models for a plurality of speech units. The speech units may be, for example, words, subwords (that is, portions of words), or sequences of words, or all of the preceding.

Speech unit model store 20 contains at least a first model for a first speech unit. The model has at least two states, at least one transition extending from a state to the same or another state, a transition probability for each transition, a plurality of model outputs for at least one prototype vector at a transition, and output probabilities at a transition for each model output. Each model output comprises the identification value of the prototype vector and a rank score.

Figure 2:
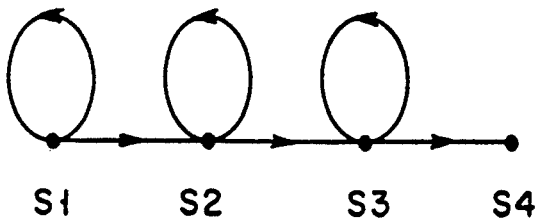
FIG. 2 is a schematic diagram of an example of a probabilistic model of a speech unit.

FIG. 2 and Tables 6 and 7 illustrate hypothetical examples of probabilistic models of speech units "A" and "B". Each model has four states S1, S2, S3, and S4. Each of states S1, S2, and S3 have one transition extending from the state back to the same state, and have another transition extending from the state to the next state. As shown in Tables 6 and 7, each transition has a transition probability and a plurality of model outputs. In these examples, at each transition, the model outputs the identification value and rank score of only one prototype vector. However, in general, at each transition, the model may output the identification value and rank score of a plurality of prototype vectors.

TABLE 6

| | | Probabilistic Model of Speech Unit "A" | | | | |
|---|---|---|---|---|---|---|
| Transition | Transition Probability | Model Outputs and Output Probabilities | | | | |
| | | (P1,R1) | (P1,R2) | (P1,R3) | (P1,R4) | (P1,R5) |
| S1 → S1 | 0.4 | 0.7 | 0.1 | 0.1 | 0.05 | 0.05 |
| S1 → S2 | 0.6 | 0.7 | 0.1 | 0.1 | 0.05 | 0.05 |
| | | (P2,R1) | (P2,R2) | (P2,R3) | (P2,R4) | (P2,R5) |
| S2 → S2 | 0.3 | 0.85 | 0.06 | 0.03 | 0.03 | 0.03 |
| S2 → S3 | 0.7 | 0.85 | 0.06 | 0.03 | 0.03 | 0.03 |
| | | (P3,R1) | (P3,R2) | (P3,R3) | (P3,R4) | (P3,R5) |
| S3 → S3 | 0.45 | 0.5 | 0.2 | 0.1 | 0.1 | 0.1 |
| S3 → S4 | 0.55 | 0.5 | 0.2 | 0.1 | 0.1 | 0.1 |

TABLE 7

| | | Probabilistic Model of Speech Unit "B" | | | | |
|---|---|---|---|---|---|---|
| Transition | Transition Probability | Model Outputs and Output Probabilities | | | | |
| | | (P5,R1) | (P5,R2) | (P5,R3) | (P5,R4) | (P5,R5) |
| S1 → S1 | 0.4 | 0.75 | 0.1 | 0.05 | 0.05 | 0.05 |
| S1 → S2 | 0.6 | 0.75 | 0.1 | 0.05 | 0.05 | 0.05 |
| | | (P3,R1) | (P3,R2) | (P3,R3) | (P3,R4) | (P3,R5) |
| S2 → S2 | 0.45 | 0.5 | 0.2 | 0.1 | 0.1 | 0.1 |
| S2 → S3 | 0.55 | 0.5 | 0.2 | 0.1 | 0.1 | 0.1 |
| | | (P2,R1) | (P2,R2) | (P2,R3) | (P2,R4) | (P2,R5) |
| S3 → S3 | 0.3 | 0.85 | 0.06 | 0.03 | 0.03 | 0.03 |
| S3 → S4 | 0.7 | 0.85 | 0.06 | 0.03 | 0.03 | 0.03 |

Thus, for example, the model output (P5, R1) represents the identification value of prototype vector P5 and a rank score of "1" (R1).

Finally, as shown in Tables 6 and 7, each of the hypothetical probabilistic speech unit models has an output probability at each transition for each model output.

The model output probabilities of the probabilistic models of speech units may be estimated by the forward-backward algorithm, and may be smoothed by deleted estimation in the same manner known for discrete parameter Markov models based on the utterance of a known training text. (See, for example, F. Jelinek, "Continuous Speech Recognition by Statistical Methods." *Proceedings of the IEEE*, Volume 64, No. 4, pages 532-556, April 1976; and F. Jelinek, et al, "Interpolated Estimation of Markov Source Parameters from Sparse Data." *Pattern Recognition in Practice*, pages 381-402, 1980.)

Returning to FIG. 1, the speech recognition apparatus according to the present invention includes a match score processor 22 for generating a match score for each of a plurality of speech units. Each match score comprises an estimate of the probability that the probabilistic model of the speech unit would output a series of model outputs matching a reference series comprising the identification value and rank score of at least one prototype vector from each coded utterance representation signal in the series of coded utterance representation signals.

Tables 8 and 9 show hypothetical examples of generating match scores between the hypothetical series of five coded utterance representation signals of Table 4 and the hypothetical four-state probabilistic speech unit models of Tables 6 and 7.

TABLE 8

| MATCH SCORE GENERATION: Speech Unit "A" | | | | | |
|---|---|---|---|---|---|
| time | t1 | t2 | t3 | t4 | t5 |
| Path 1 | | | | | |
| Transition | S1 → S1 | S1 → S1 | S1 → S2 | S2 → S3 | S3 → S4 |
| Coded Utterance Representation | | | | | |
| (identification value, rank value) | (P1,R2) | (P1,R1) | (P1,R4) | (P2,R1) | (P3,R2) |
| Transition Prob. | 0.4 | 0.4 | 0.6 | 0.7 | 0.55 |
| Model Output Prob. | 0.1 | 0.7 | 0.05 | 0.85 | 0.2 |
| Path 1 Probability = 0.0000219 | | | | | |
| Path 2 | | | | | |
| Transition | S1 → S1 | S1 → S2 | S2 → S2 | S2 → S3 | S3 → S4 |
| Coded Utterance Representation | | | | | |
| (identification value, rank value) | (P1,R2) | (P1,R1) | (P2,R3) | (P2,R1) | (P3,R2) |
| Transition Prob. | 0.4 | 0.6 | 0.3 | 0.7 | 0.55 |
| Model Output Prob. | 0.1 | 0.7 | 0.03 | 0.85 | 0.2 |
| Path 2 Probability = 0.0000098 | | | | | |
| Path 3 | | | | | |
| Transition | S1 → S1 | S1 → S2 | S2 → S3 | S3 → S3 | S3 → S4 |
| Coded Utterance Representation | | | | | |
| (identification value, rank value) | (P1,R2) | (P1,R1) | (P2,R3) | (P3,R4) | (P3,R2) |
| Transition Prob. | 0.4 | 0.6 | 0.7 | 0.45 | 0.55 |
| Model Output Prob. | 0.1 | 0.7 | 0.03 | 0.1 | 0.2 |
| Path 3 Probability = 0.0000017 | | | | | |
| Path 4 | | | | | |
| Transition | S1 → S2 | S2 → S2 | S2 → S2 | S2 → S3 | S3 → S4 |
| Coded Utterance Representation | | | | | |
| (identification value, rank value) | (P1,R2) | (P2,R1) | (P2,R3) | (P2,R1) | (P3,R2) |
| Transition Prob. | 0.6 | 0.3 | 0.3 | 0.7 | 0.55 |
| Model Output Prob. | 0.1 | 0.85 | 0.03 | 0.85 | 0.2 |
| Path 4 Probability = 0.0000090 | | | | | |
| Path 5 | | | | | |
| Transition | S1 → S2 | S2 → S3 | S3 → S3 | S3 → S3 | S3 → S4 |
| Coded Utterance Representation | | | | | |
| (identification value, rank value) | (P1,R2) | (P2,R1) | (P3,R1) | (P3,R4) | (P3,R2) |
| Transition Prob. | 0.6 | 0.7 | 0.45 | 0.45 | 0.55 |
| Model Output Prob. | 0.1 | 0.85 | 0.5 | 0.1 | 0.2 |
| Path 5 Probability = 0.0000397 | | | | | |
| Total Match Score = 0.0000824 | | | | | |

TABLE 9

| MATCH SCORE GENERATION: Speech Unit "B" | | | | | |
|---|---|---|---|---|---|
| time | t1 | t2 | t3 | t4 | t5 |
| Path 1 | | | | | |
| Transition | S1 → S1 | S1 → S1 | S1 → S2 | S2 → S3 | S3 → S4 |
| Coded Utterance Representation | | | | | |
| (identification value, rank value) | (P5,R1) | (P5,R4) | (P5,R5) | (P3,R4) | (P2,R3) |
| Transition Prob. | 0.4 | 0.4 | 0.6 | 0.55 | 0.7 |
| Model Output Prob. | 0.75 | 0.05 | 0.05 | 0.1 | 0.03 |
| Path 1 Probability = 0.0000002 | | | | | |
| Path 2 | | | | | |
| Transition | S1 → S1 | S1 → S2 | S2 → S2 | S2 → S3 | S3 → S4 |
| Coded Utterance Representation | | | | | |
| (identification value, rank value) | (P5,R1) | (P5,R4) | (P3,R1) | (P3,R4) | (P2,R3) |
| Transition Prob. | 0.4 | 0.6 | 0.45 | 0.55 | 0.7 |
| Model Output Prob. | 0.75 | 0.05 | 0.5 | 0.1 | 0.03 |
| Path 2 Probability = 0.0000023 | | | | | |
| Path 3 | | | | | |
| Transition | S1 → S1 | S1 → S2 | S2 → S3 | S3 → S3 | S3 → S4 |
| Coded Utterance Representation | | | | | |
| (identification value, rank value) | (P5,R1) | (P5,R4) | (P3,R1) | (P2,R1) | (P2,R3) |

TABLE 9-continued

| | MATCH SCORE GENERATION: Speech Unit "B" | | | | |
|---|---|---|---|---|---|
| time | t1 | t2 | t3 | t4 | t5 |
| Transition Prob. | 0.4 | 0.6 | 0.55 | 0.3 | 0.7 |
| Model Output Prob. | 0.75 | 0.05 | 0.5 | 0.85 | 0.03 |
| Path 3 Probability = 0.0000132 | | | | | |
| Path 4 | | | | | |
| Transition | S1 → S2 | S2 → S2 | S2 → S2 | S2 → S3 | S3 → S4 |
| Coded Utterance Representation | | | | | |
| (identification value, rank value) | (P5,R1) | (P3,R5) | (P3,R1) | (P3,R4) | (P2,R3) |
| Transition Prob. | 0.6 | 0.45 | 0.45 | 0.55 | 0.7 |
| Model Output Prob. | 0.75 | 0.1 | 0.5 | 0.1 | 0.03 |
| Path 4 Probability = 0.0000052 | | | | | |
| Path 5 | | | | | |
| Transition | S1 → S2 | S2 → S3 | S3 → S3 | S3 → S3 | S3 → S4 |
| Coded Utterance Representation | | | | | |
| (identification value, rank value) | (P5,R1) | (P3,R5) | (P2,R3) | (P2,R1) | (P2,R3) |
| Transition Prob. | 0.6 | 0.55 | 0.3 | 0.3 | 0.7 |
| Model Output Prob. | 0.75 | 0.1 | 0.03 | 0.85 | 0.03 |
| Path 5 Probability = 0.0000011 | | | | | |
| Total Match Score = 0.0000222 | | | | | |

There are five possible different paths through each four-state model which are capable of generating a series of exactly five coded utterance representation signals. The probability of each path generating the observed series of five coded utterance representation signals is estimated, and summed to produce the total match score for each speech unit model. In this example, the total match score for the model of speech unit "A" is better (more probable) than the total match score for the model of speech unit "B". Therefore, best candidate speech units selector 24 will identify at least the one best candidate speech unit "A" having the best match score, and speech subunit output 26 will output at least one speech subunit of at least speech unit "A".

If all of the speech units comprise sequences of two or more words, and if the word sequences of all of the best candidate speech units begin with the same word, then the speech subunit output 26 may, for example, output that one word which forms the beginning of all of the best candidate speech units.

The match score processor 22 may, in addition to estimating the probability that the probabilistic model of a speech unit would output a series of model outputs matching a reference series of coded utterance representation signals, also estimate the probability of occurrence of the speech unit itself. The estimate of the probability of occurrence of the speech unit may be obtained by a language model. (See, for example, Jelinek, 1976, above.)

The comparison processor 14, the rank score processor 16, the match score processor 22, and the best candidate speech units selector 24 according to the present invention may be made by suitably programming either a special purpose or a general purpose digital computer system. Stores 12, 18, and 20 may be electronic computer memory. The speech subunit output 26 may be, for example, a video display, such as a cathode ray tube, a liquid crystal display, or a printer. Alternatively, the output means may be an audio output device, such as a speech synthesizer having a loudspeaker or headphones.

Figure 3:
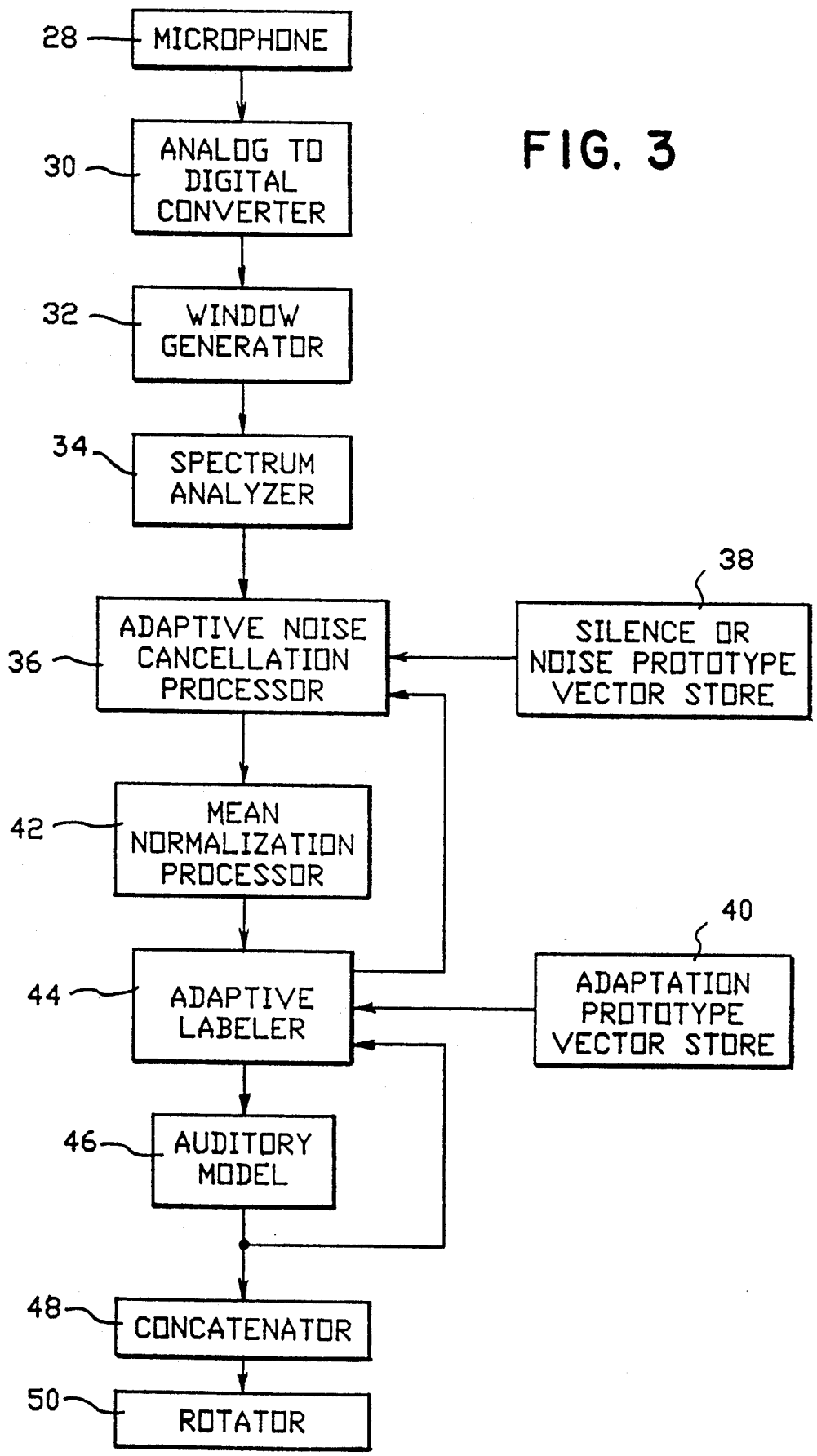
FIG. 3 is a block diagram of an example of an acoustic feature value measure.

One example of an acoustic feature value measure is shown in FIG. 3. The measuring means includes a microphone 28 for generating an analog electrical signal corresponding to the utterance. The analog electrical signal from microphone 28 is converted to a digital electrical signal by analog to digital converter 30. For this purpose, the analog signal may be sampled, for example, at a rate of twenty kilohertz by the analog to digital converter 30.

A window generator 32 obtains, for example, a twenty millisecond duration sample of the digital signal from analog to digital converter 30 every ten milliseconds (one centisecond). Each twenty millisecond sample of the digital signal is analyzed by spectrum analyzer 34 in order to obtain the amplitude of the digital signal sample in each of, for example, twenty frequency bands. Preferably, spectrum analyzer 34 also generates a twenty-first dimension signal representing the total amplitude or total power of the ten millisecond digital signal sample. The spectrum analyzer 34 may be, for example, a fast Fourier transform processor. Alternatively, it may be a bank of twenty band pass filters.

The twenty-one dimension vector signals produced by spectrum analyzer 34 may be adapted to remove background noise by an adaptive noise cancellation processor 36. Noise cancellation processor 36 subtracts a noise vector N(t) from the feature vector F(t) input into the noise cancellation processor to produce an output feature vector F'(t). The noise cancellation processor 36 adapts to changing noise levels by periodically updating the noise vector N(t) whenever the prior feature vector F(t−1) is identified as noise or silence. The noise vector N(t) is updated according to the formula $$N(t) = \frac{N(t-1) + k[F(t-1) - Fp(t-1)]}{(1+k)}, \quad [1]$$

where N(t) is the noise vector at time t, N(t−1) is the noise vector at time (t−1), k is a fixed parameter of the adaptive noise cancellation model, F(t−1) is the feature vector input into the noise cancellation processor 36 at time (t−1) and which represents noise or silence, and Fp(t−1) is one silence or noise prototype vector, from store 38, closest to feature vector F(t−1).

The prior feature vector F(t−1) is recognized as noise or silence if either (a) the total energy of the vector is below a threshold, or (b) the closest prototype vector in adaptation prototype vector store 40 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of the input speech by short term mean normalization processor 42. Normalization processor 42 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad [2]$$

in the logarithmic domain, where $F'_i(t)$ is the i-th component of the unnormalized vector at time t, and where Z(t) is a weighted mean of the components of F'(t) and Z(t−1) according to Equations 3 and 4:

$$Z(t) = 0.9Z(t-1) + 0.1M(t) \quad [3]$$

and where $$M(t) = \frac{1}{20} \sum_i F_i(t) \quad [4]$$

The normalized twenty dimension feature vector X(t) may be further processed by an adaptive labeler 44 to adapt to variations in pronunciation of speech sounds. An adapted twenty dimension feature vector X'(t) is generated by subtracting a twenty dimension adaption vector A(t) from the twenty dimension feature vector X(t) provided to the input of the adaptive labeler 44. The adaptation vector A(t) at time t may, for example, be given by the formula $$A(t) = \frac{A(t-1) + k[X(t-1) - Xp(t-1)]}{(1+k)}, \quad [5]$$

where k is a fixed parameter of the adaptive labeling model, X(t−1) is the normalized twenty dimension vector input to the adaptive labeler 44 at time (t−1), Xp(t−1) is the adaptation prototype vector (from adaptation prototype store 40) closest to the twenty dimension feature vector X(t−1) at time (t−1), and A(t−1) is the adaptation vector at time (t−1).

The twenty dimension adapted feature vector signal X'(t) from the adaptive labeler 44 is preferably provided to an auditory model 46. Auditory model 46 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 46 calculates a new parameter $E_i(t)$ according to Equations 6 and 7:

$$E_i(t) = K_1 + K_2(X'_i(t))(N_i(t-1)) \quad [6]$$

where $$N_i(t) = K_3 \times N_i(t-1) - E_i(t-1) \quad [7]$$

and where $K_1$, $K_2$, and $K_3$ are fixed parameters of the auditory model.

For each centisecond time interval, the output of the auditory model 46 is a modified twenty dimension feature vector signal.

This feature vector is augmented by a twenty-first dimension having a value equal to the square root of the sum of the squares of the values of the other twenty dimensions.

For each centisecond time interval, a concatenator 48 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 50 by a rotation matrix to rotate the spliced vector and to reduce the spliced vector to fifty dimensions.

The rotation matrix used in rotator 50 may be obtained, for example, by classifying into M classes a set of 189 dimension spliced vectors obtained during a training session. The covariance matrix for all of the spliced vectors in the training set is multiplied by the inverse of the sample within-class covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, IBM Technical Disclosure Bulletin, Volume 32, No. 7, December 1989, pages 320 and 321.) Window generator 32, spectrum analyzer 34, adaptive noise cancellation processor 36, short term mean normalization processor 42, adaptive labeler 44, auditory model 46, concatenator 48, and rotator 50, may be suitably programmed special purpose or general purpose digital signal processors. Prototype stores 38 and 40 may be electronic computer memory.

The prototype vectors in prototype store 12 may be obtained, for example, by clustering feature vector signals from a training set into a plurality of clusters, and then calculating the mean and standard deviation for each cluster. When the training script comprises a series of word-segment models (forming a model of a series of words), and each word-segment model comprises a series of elementary models having specified locations in the word-segment models, the feature vector signals may be clustered by specifying that each cluster corresponds to a single elementary model in a single location in a single word-segment model. Such a method is described in more detail in U.S. patent application Ser. No. 730,714, filed on Jul. 16, 1991, entitled "Fast Algorithm for Deriving Acoustic Prototypes for Automatic Speech Recognition."

Alternatively, all acoustic feature vectors generated by the utterance of a training text and which correspond to a given elementary model may be clustered by K-means Euclidean clustering or K-means Gaussian clustering, or both. Such a method is described, for example, in U.S. patent application Ser. No. 673,810, filed on Mar. 22, 1991 entitled "Speaker-Independent Label Coding Apparatus".

We claim:

1. A speech coding apparatus comprising:
    means for measuring the value of at least one feature of an utterance over each of a series of successive time intervals to produce a series of feature vector signals representing the feature values;

means for storing a plurality of prototype vector signals, each prototype vector signal having at least one parameter value and having a unique identification value;

means for comparing the closeness of the feature value of a first feature vector signal to the parameter values of the prototype vector signals to obtain prototype match scores for the first feature vector signal and each prototype vector signal;

ranking means for associating a first-rank score with the prototype vector signal having the best prototype match score, and for associating a second-rank score with the prototype vector signal having the second best prototype match score; and means for outputting at least the identification value and the rank score of the prototype vector signal having the first-rank score, and the identification value and the rank score of the prototype vector signal having the second-rank score, as a coded utterance representation signal of the first feature vector signal.

2. A speech coding apparatus as claimed in claim 1, characterized in that:

the ranking means comprises means for ranking all of the prototype match scores for the first feature vector signal from highest to lowest and for associating a rank score with each prototype match score, each rank score representing the estimated closeness of the associated prototype vector signal to the first feature vector signal relative to the estimated closeness of all other prototype vector signals to the first feature vector signal; and the outputting means comprises means for outputting the identification value of each prototype vector signal and the rank score of each prototype vector signal as a coded utterance representation signal of the first feature vector signal.

3. A speech coding apparatus as claimed in claim 2, further comprising means for storing the coded utterance representation signal of the feature vector signal.

4. A speech coding apparatus as claimed in claim 3, characterized in that the rank score for a selected prototype vector signal for a given feature vector signal is monotonically related to the number of other prototype vector signals having prototype match scores better than the prototype match score of the selected prototype vector signal for the given feature vector signal.

5. A speech coding apparatus as claimed in claim 4, characterized in that the means for storing prototype vector signals comprises electronic read/write memory.

6. A speech coding apparatus as claimed in claim 5, characterized in that the measuring means comprises a microphone.

7. A speech coding method comprising:

measuring the value of at least one feature of an utterance over each of a series of successive time intervals to produce a series of feature vector signals representing the feature values;

storing a plurality of prototype vector signals, each prototype vector signal having at least one parameter value and having a unique identification value;

comparing the closeness of the feature value of a first feature vector signal to the parameter values of the prototype vector signals to obtain prototype match scores for the first feature vector signal and each prototype vector signal;

ranking the prototype vector signal having the best prototype match score with a first-rank score, and ranking the prototype vector signal having the second best prototype match score with a second-rank score; and outputting at least the identification value and the rank score of the prototype vector signal having the first-rank score, and the identification value and the rank score of the prototype vector signal having the second-rank score, as a coded utterance representation signal of the first feature vector signal.

8. A speech coding method as claimed in claim 7, characterized in that:

the step of ranking comprises ranking all of the prototype match scores for the first feature vector signal from highest to lowest and for associating a rank score with each prototype match score, each rank score representing the estimated closeness of the associated prototype vector signal to the first feature vector signal relative to the estimated closeness of all other prototype vector signals to the first feature vector signal; and the step of outputting comprises outputting the identification value of each prototype vector signal and the rank score of each prototype vector signal as a coded utterance representation signal of the first feature vector signal.

9. A speech coding method as claimed in claim 8, further comprising the step of storing the coded utterance representation signals of all of the feature vector signals.

10. A speech coding method as claimed in claim 9, characterized in that the rank score for a selected prototype vector signal for a given feature vector signal is monotonically related to the number of other prototype vector signals having prototype match scores better than the prototype match score of the selected prototype vector signal for the given feature vector signal.

11. A speech recognition apparatus comprising:

means for measuring the value of at least one feature of an utterance over each of a series of successive time intervals to produce a series of feature vector signals representing the feature values;

means for storing a plurality of prototype vector signals, each prototype vector signal having at least one parameter value and having a unique identification value;

means for comparing the closeness of the feature value of each feature vector signal to the parameter values of the prototype vector signals to obtain prototype match scores for each feature vector signal and each prototype vector signal;

ranking means for associating, for each feature vector signal, a first-rank score with the prototype vector signal having the best prototype match score, and a second-rank score with the prototype vector signal having the second best prototype match score;

means for outputting, for each feature vector signal, at least the identification value and the rank score of the prototype vector signal having the first-rank score, and the identification value and the rank score of the prototype vector signal having the second-rank score, as a coded utterance representation signal of the feature vector signal, to produce a series of coded utterance representation signals;

means for storing probabilistic models for a plurality of speech units, at least a first model for a first speech unit having (a) at least two states, (b) at least one transition extending from a state to the same or another state, (c) a transition probability for each transition, (d) a plurality of model outputs for at least one prototype vector at a transition, each model output comprising the identification value of the prototype vector and a rank score, and (e) output probabilities at a transition for each model output;

means for generating a match score for each of a plurality of speech units, each match score comprising an estimate of the probability that the probabilistic model of the speech unit would output a series of model outputs matching a reference series comprising the identification value and rank score of at least one prototype vector from each coded utterance representation signal in the series of coded utterance representation signals;

means for identifying one or more best candidate speech units having the best match scores; and means for outputting at least one speech subunit of one or more of the best candidate speech units.

12. A speech recognition apparatus as claimed in claim 11, characterized in that:

the ranking means comprises means for associating a rank score with all prototype vector signals for each feature vector signal, each rank score representing the estimated closeness of the associated prototype vector signal to the feature vector signal relative to the estimated closeness of all other prototype vector signals to the feature vector signal; and the outputting means comprises means for outputting for each feature vector signal the identification values and the rank scores of the prototype vector signals as a coded utterance representation signal of the feature vector signal, to produce a series of coded utterance representation signals.

13. A speech recognition apparatus as claimed in claim 12, characterized in that the rank score for a selected prototype vector signal for a given feature vector signal is monotonically related to the number of other prototype vector signals having prototype match scores better than the prototype match score of the selected prototype vector signal for the given feature vector signal.

14. A speech recognition apparatus as claimed in claim 11, characterized in that each match score further comprises an estimate of the probability of occurrence of the speech unit.

15. A speech recognition apparatus as claimed in claim 14, characterized in that the means for storing prototype vector signals comprises electronic read/write memory.

16. A speech recognition apparatus as claimed in claim 15, characterized in that the measuring means comprises a microphone.

17. A speech recognition apparatus as claimed in claim 16, characterized in that the speech subunit output means comprises a video display.

18. A speech recognition apparatus as claimed in claim 17, characterized in that the video display comprises a cathode ray tube.

19. A speech recognition apparatus as claimed in claim 17, characterized in that the video display comprises a liquid crystal display.

20. A speech recognition apparatus as claimed in claim 17, characterized in that the video display comprises a printer.

21. A speech recognition apparatus as claimed in claim 16, characterized in that the speech subunit output means comprises an audio generator.

22. A speech recognition apparatus as claimed in claim 21, characterized in that the audio generator comprises a loudspeaker.

23. A speech recognition apparatus as claimed in claim 21, characterized in that the audio generator comprises a headphone.

24. A speech recognition method comprising:

measuring the value of at least one feature of an utterance over each of a series of successive time intervals to produce a series of feature vector signals representing the feature values;

storing a plurality of prototype vector signals, each prototype vector signal having at least one parameter value and having a unique identification value;

comparing the closeness of the feature value of each feature vector signal to the parameter values of the prototype vector signals to obtain prototype match scores for each feature vector signal and each prototype vector signal;

ranking, for each feature vector signal, the prototype vector signal having the best prototype match score with a first-rank score, and the prototype vector signal having the second best prototype match score with a second-rank score;

outputting, for each feature vector signal, at least the identification value and the rank score of the prototype vector signal having the first-rank score, and the identification value and the rank score of the prototype vector signal having the second-rank score, as a coded utterance representation signal of the feature vector signal, to produce a series of coded utterance representation signals;

storing probabilistic models for a plurality of speech units, at least a first model for a first speech unit having (a) at least two states, (b) at least one transition extending from a state to the same or another state, (c) a transition probability for each transition, (d) a plurality of model outputs for at least one prototype vector at a transition, each model output comprising the identification value of the prototype vector and a rank score, (e) output probabilities at a transition for each model output;

generating a match score for each of a plurality of speech units, each match score comprising an estimate of the probability that the probabilistic model of the speech unit would output a series of model outputs matching a reference series comprising the identification value and rank score of at least one prototype vector from each coded utterance representation signal in the series of coded utterance representation signals;

identifying one or more best candidate speech units having the best match scores; and outputting at least one speech subunit of one or more of the best candidate speech units.

25. A speech recognition method as claimed in claim 24, characterized in that:

the step of ranking comprises associating a rank score with all prototype vector signals for each feature vector signal, each rank score representing the estimated closeness of the associated prototype vector signal to the feature vector signal relative to the estimated closeness of all other prototype vector signals to the feature vector signal; and the step of outputting comprises outputting for each feature vector signal the identification values and the rank scores of the prototype vector signals as a coded utterance representation signal of the feature vector signal, to produce a series of coded utterance representation signals.

26. A speech recognition method as claimed in claim 25, characterized in that the rank score for a selected prototype vector signal for a given feature vector signal is monotonically related to the number of other prototype vector signals having prototype match scores better than the prototype match score of the selected prototype vector signal for the given feature vector signal.

27. A speech recognition method as claimed in claim 24, characterized in that each match score further comprises an estimate of the probability of occurrence of the speech unit.

* * * * *